June 14, 1960

P. F. McADAMS 2,940,533

TWO-WHEELED TRACTOR

Filed Jan. 24, 1957

2 Sheets-Sheet 1

INVENTOR.
PAUL F. McADAMS
BY
Kenneth C. Witt
ATTY.

June 14, 1960 P. F. McADAMS 2,940,533
TWO-WHEELED TRACTOR
Filed Jan. 24, 1957 2 Sheets-Sheet 2

INVENTOR.
PAUL F. McADAMS
BY Kenneth C. Witt
ATTY.

2,940,533

TWO-WHEELED TRACTOR

Paul F. McAdams, St. Joseph, Mich., assignor to Clark Equipment Company, a corporation of Michigan Filed Jan. 24, 1957, Ser. No. 636,020

6 Claims. (Cl. 180—12)

This invention relates to two-wheeled tractors of the type used in unitary connection with a two-wheeled trailer to form a complete vehicle of the articulated or so-called "fifth wheel" type. Such vehicles frequently take the form of earth working, construction, or logging machines, with the trailer portion of the vehicle comprising a scraper, wagon, logging arch or the like.

In such tractors it is desirable to maintain the length of the overhanging portion ahead of the axle as short as possible. Moreover, it is essential to have the weight of the portion of the tractor in front of the axle not too far out of balance with respect to the portion behind the axle for good operation and to minimize the stresses in the various parts of the vehicle. The vertical pivotal draft and steering connection between the tractor portion and the trailer portion of the vehicle can be located on the tractor in a place which will help balance the weights to the front and rear of the tractor axle; however, the location of this connection must be kept within reasonable limits because moment arm lengths and fulcrum points change considerably when the vehicle is being steered sharply to one side or the other.

The primary object of the present invention is to provide a construction for a two-wheeled tractor of the type mentioned hereinbefore which provides readily for the location of the various parts of the tractor in a manner to achieve optimum weight distribution.

A further object is to provide a simple and rugged construction which accomplishes the aforementioned object and at the same time affords maximum convenience in assembling and servicing the parts of the tractor and results in good protection for the various parts during operation.

In carrying out my invention in one form I provide in a two-wheeled tractor a bearing member having a longitudinally disposed aperture therethrough and a coupling structure pivotally mounted on the said bearing member to pivot about a horizontal axis. The engine of the tractor is located ahead of the bearing member and the transmission is located to the rear of this member, while a shaft for transmitting power from the engine to the transmission extends through the aperture in the bearing member.

Figure 1:
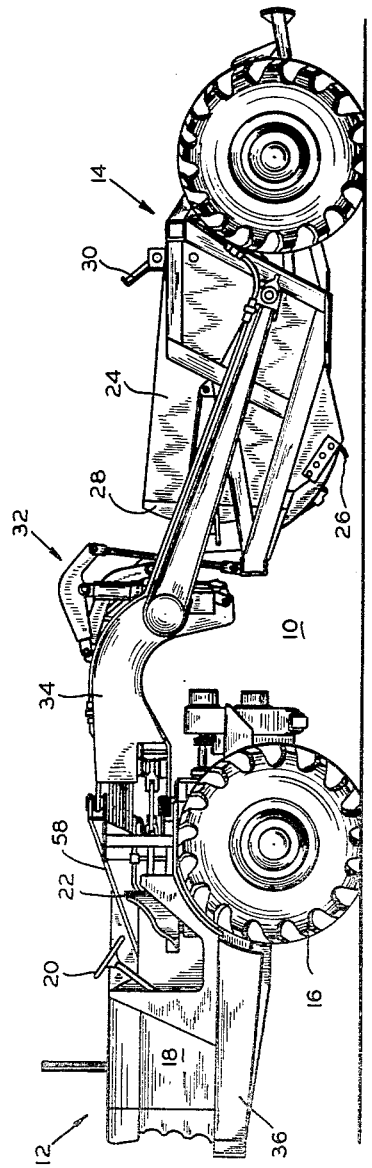
Figure 2:
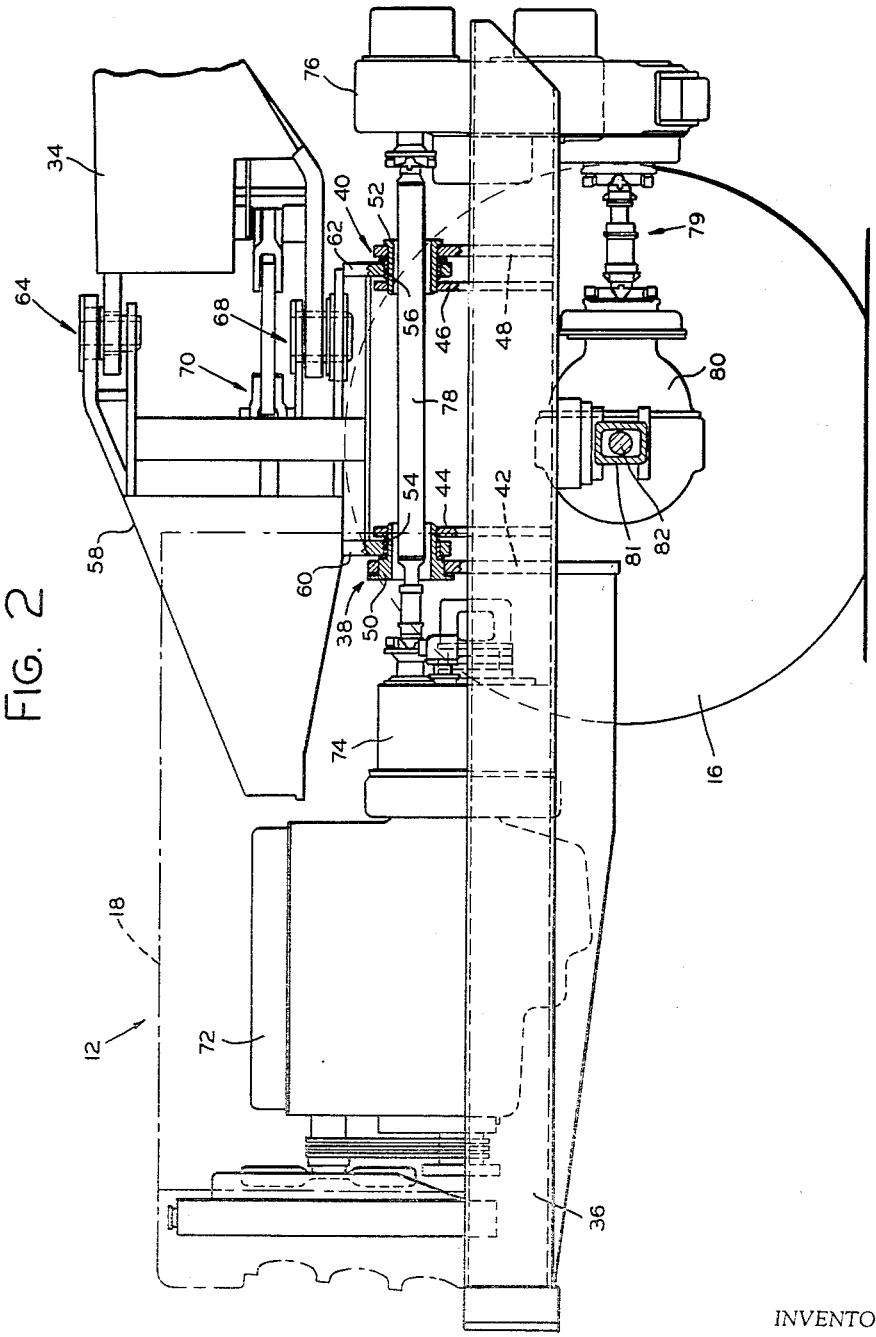

For a clearer and more complete understanding of my invention reference should be made to the accompanying drawing in which:

Figure 1 is a side elevational view of a scraper vehicle comprising a two-wheeled trailer scraper drawn by a two-wheeled tractor embodying the present invention, and Figure 2 is an enlarged side view of the tractor with portions broken away to show the elements of the present invention.

I have designated generally by the numeral 10 in Figure 1 a vehicle made up of a two-wheeled tractor portion 12 and a two-wheeled trailer portion 14. The tractor portion 12 includes a pair of rubber-tired wheels 16 (see Figures 1 and 2) mounted at the outer ends of a transverse axle, an engine or other prime mover 72 (see Figure 2) within enclosure 18, an operator's station including a steering wheel 20 and seat 22, and other parts described in greater detail hereinafter.

The trailer portion of the vehicle illustrated is in the form of a scraper for loading, transporting, and unloading earth and includes a main bowl portion 24 having a cutting edge 26, an apron 28 for closing the front end of the bowl, an ejector mechanism 30, remotely controlled means at 32 for raising and lowering the apron and bowl, and a yoke or gooseneck portion at 34 for connecting the trailer 14 to the tractor 12.

The tractor 12 includes a main frame 36 which comprises a pair of transversely spaced side members (only one of which is visible in the drawing) interconnected by suitable cross members. These cross members include a pair of brace portions 38 and 40 each of which is made up of a pair of transverse plate members connected between the two side members of the frame. I have labelled the plates making up the front brace portion 38 with the numerals 42 and 44 while the two plates making up the rear brace portion 40 are indicated by the characters 46 and 48. Connected to and supported by the brace portions 38 and 40 are a pair of annular bearing members 50 and 52 respectively, and wear resistant bushing or sleeve members 54 and 56 may be provided around the outer surfaces of bearing members 50 and 52.

A coupling structure 58 is pivotally mounted on tractor 12 by means of a pair of depending members 60 and 62 which have openings therein for receiving bearing members 50 and 52 and their sleeves 54 and 56. This arrangement permits the coupling structure 58 to pivot about a longitudinal horizontal axis on the tractor, and it will be understood by those familiar with fifth wheel vehicles of the type described and illustrated herein that such pivoting action of the tractor coupling structure frequently is necessary or desirable to permit the vehicle to negotiate rough terrain. Tractor coupling structure 58 is connected to yoke 34 of the trailer portion of the vehicle by means of spaced pivot connections at 64 and 68 to provide a combined draft and steering connection between the tractor and trailer. The vehicle is steered by turning the tractor with respect to the trailer about the vertically disposed pivot axis through connections 64 and 68 by suitable power operated means connected between the two portions of the vehicle; and a part of the power operated means is visible at 70.

The vehicle 10 illustrated herein is propelled by means of an engine 72 forming a portion of tractor 12 and mounted on the frame 36 thereof forwardly of the axle (described below). The engine 72 operates the vehicle through a torque converter 74 which is connected to a change speed transmission 76 aft of the axle by means of a propeller shaft 78. Shaft 78 extends longitudinally through the apertures in bearing members 50 and 52. The output of the transmission 76 is connected by shaft means 79 to a conventional differential mechanism within enclosure 80 which forms a portion of the axle housing 81 of the tractor. The differential 80 in turn drives axle shafts 82 (only one of which is visible in the drawing) which drive the wheels of the tractor at either end of the axle.

This construction, including the location of the shaft 78 on the axis of the horizontal pivot connection between the coupling structure and the fixed portion of the tractor provides a very compact arrangement of the essential parts of the tractor 12, permitting the overhanging portion ahead of the axle to be kept to a minimum. This construction is versatile in permitting location of the various heavy parts at locations which will afford the optimum weight distribution. For example, it will be appreciated that torque converter 74 could be located to the rear of the horizontal pivot connection adjacent to transmission 76 if desired or it could be located between bearing members 50 and 52. It will be appreciated also that in the machine described and illustrated herein space is provided between bearing members 50 and 52 where a power takeoff or electric or hydraulic retarder could be located if desired.

Even with all its desirable features, however, it will be understood by those skilled in the art that my construction is a rugged and simple one and at the same time one which employs a minimum of shafts, universal joints and other parts necessary for interconnecting the main elements of the drive line from the engine to the wheels. Furthermore, this construction provides good protection for the shaft 78, transmission 76 and other parts which are susceptible to damage from falling objects and other hazards of operation. Nevertheless, the transmission 76, torque converter 74 and other parts are in locations which are convenient for assembly and likewise are convenient for servicing them later.

While I have described and illustrated herein a preferred embodiment of my invention, it will be appreciated that modifications may be made. For example, it would be possible without departing from the invention to reverse the elements providing the pivotal connection between coupling structure 58 and tractor 12; that is, have bearing members 50 and 52 and their sleeves 54 and 56 mounted on the coupling structure 58, with coacting pivotal members, corresponding to members 60 and 62, mounted on the tractor 12. I intend to cover by the appended claims all such modifications which fall within the true spirit and scope of my invention.

I claim:

1. In a two-wheeled tractor, a frame portion, a single transverse axle for the wheels, connections to the said frame portion for a coupling member adaptable for joining a trailer to the tractor, said connections comprising a pair of longitudinally spaced bearing members having aligned apertures therethrough, rotating shaft power transmitting means for propelling the tractor extending from a point forwardly of the said axle through the said apertures to a point aft of the axle, and additional power transmitting means interconnecting the said rotating shaft power transmitting means and the said axle for driving the wheels.

2. In a two-wheeled tractor having a frame and a single transverse axle for the wheels, connections to the frame for a trailer coupling structure comprising at least one bearing member having a longitudinally disposed aperture therethrough, rotating shaft power transmitting means for propelling the tractor extending from a point forwardly of the axle through the said aperture to a point aft of the axle, and additional power transmitting means interconnecting the said rotating shaft power transmitting means and the axle for driving the wheels.

3. In a two-wheeled tractor having a frame and a single transverse axle for the wheels, a pair of longitudinally spaced bearing members on the frame having aligned openings therethrough, a coupling structure pivotally mounted on the bearing members, a change speed transmissihon located aft of the said axle and bearing members, and power transmitting shaft means extending from a point forwardly of the axle through the said apertures and connected to the said change speed transmission.

4. In a two-wheeled tractor having a coupling structure thereon, means for pivotally mounting the said coupling structure comprising longitudinally spaced brace portions, a pair of annular bearing members secured to the said brace portions, and a pair of depending portions on the coupling structure having circular openings therein for receiving the said annular bearing members, the apertures in the said annular bearing members being in longitudinal alignment, and rotating shaft power transmitting means for propelling the tractor extending through the said apertures.

5. A tractor comprising, a frame, a transversely disposed axle connected below the said frame adjacent one end thereof, an engine mounted on the frame adjacent the other end thereof, a coupling structure, means for pivotally mounting the said coupling structure on the frame adjacent the said one end, said means comprising longitudinally spaced brace portions secured to the frame, a pair of annular bearing members secured to the said brace portions, and a pair of depending portions on the said coupling structure having circular openings therein for receiving the said annular bearing members, the apertures in the said annular bearing members being in longitudinal alignment, a vertically disposed transmission mounted rearwardly of the rearmost annular bearing member, a shaft extending through the two said annular bearing members, the said shaft being connected at its front extremity for operation by the said engine and at its rear extremity to the said transmission, and shaft means connected between the said transmission and the said axle below the first mentioned shaft.

6. In a two-wheeled tractor, a frame having longitudinally spaced apart brace portions, a coupling structure, connection means pivotally mounting the said coupling structure on the said brace portions, said connection means comprising a pair of annular bearing members and a pair of members having circular openings therein, the said annular bearing members being located respectively in the said circular openings with the apertures in the annular bearing members in longitudinal alignment, and rotating shaft power transmitting means for propelling the tractor extending through the said apertures.

References Cited in the file of this patent

UNITED STATES PATENTS

| | | |
|---|---|---|
| 1,322,335 | Petersen | Nov. 18, 1919 |
| 2,022,387 | Reid | Nov. 26, 1935 |
| 2,361,935 | French | Nov. 7, 1944 |
| 2,362,262 | French | Nov. 7, 1944 |
| 2,460,725 | Armington | Feb. 1, 1949 |